US012741277B2

(12) United States Patent
Eid et al.

(10) Patent No.: US 12,741,277 B2
(45) Date of Patent: Sep. 22, 2026

(54) ACOUSTICMICROFLUIDIC DRIVEN ONE-STEP TEMPLATE-FREE ENGINEERING OF POROUS MULTIDIMENSIONAL MULTIMETALLIC NANOARCHITECTURES WITH TUNABLE SIZE, SHAPE, AND COMPOSITION

(71) Applicant: QATAR UNIVERSITY, Doha (QA)

(72) Inventors: Kamel Abdelmoniem Mohamed Eid, Sharkia (EG); Heba Adel Ahmed, Victoria (AU); Amgad Rezk, Vic (AU); Aboubakr Moustafa Abdullah, Giza (EG); Leslie Yeo, Vic (EG)

(73) Assignee: Qatar University, Doha (QA)

( * ) Notice: Subject to any disclaimer, the term of this patent is extended or adjusted under 35 U.S.C. 154(b) by 472 days.

(21) Appl. No.: 18/242,631

(22) Filed: Sep. 6, 2023

(65) Prior Publication Data

US 2025/0073690 A1 Mar. 6, 2025

(51) Int. Cl.

*B01J 35/30* (2024.01)
*B01J 35/64* (2024.01)
*B01J 37/00* (2006.01)

(52) U.S. Cl.

CPC ........... *B01J 35/393* (2024.01); *B01J 35/647* (2024.01); *B01J 37/0018* (2013.01); *B01J 2231/34* (2013.01); *B01J 2531/16* (2013.01); *B01J 2531/828* (2013.01)

(58) Field of Classification Search

CPC .... B01J 35/393; B01J 37/0018; B01J 35/647; B01J 2531/828; B01J 2231/34

See application file for complete search history.

(56) References Cited

U.S. PATENT DOCUMENTS

2013/0089739 A1* 4/2013 Polshettiwar ........ B01J 37/0018 204/157.43

OTHER PUBLICATIONS

Chengzhou Zhu et al., "Engineering Ordered and Nonordered Porous Noble Metal Nanostructures: Synthesis, Assembly, and Their Applications in Electrochemistry", ACS Publications, Chemical Reviews 2015, 115, 8896-8943, pubs.acs.org/CR, DOI:10.1021/acs.chemrev.5b00255, 48 pages.

Xiao-Yu Yang et al., "Hierarchically porous materials: synthesis strategies and structure design", Chem Soc Rev, Royal Society of Chemistry, www.rsc.org/chemsocrev, DOI:10.1039/c6cs00829a, 78 pages.

Chengzhou Zhu et al., "Highly efficient nonprecious metal catalysts towards oxygen reduction reaction based on three-dimensional porous carbon nanostructures", Chem Soc Rev, Royal Society of Chemistry, www.rsc.org/chemsocrev, DOI:10.1039/c5cs00670h, 15 pages.

Kateryna Loza et al., "Synthesis, Structure, Properties, and Applications of Bimetallic Nanoparticles of Noble Metals", www.afm-journal.de, Advanced Functional Materials 2020, 30, 1909260, DOI:10.1002/adfm.201909260, 14 pages.

(Continued)

*Primary Examiner* — Wayne A Langel

(74) *Attorney, Agent, or Firm* — Hodgson Russ LLP

(57) ABSTRACT

Described herein is the controlled room temperature acousticmicrofluidic-based one-step template-free fabrication of porous multimetallic nanocrystals containing one or more 3d transition metals with tunable size, shape, and composition.

20 Claims, 7 Drawing Sheets

(56) References Cited

OTHER PUBLICATIONS

Xiaojing Wang et al., "Synthesis, Properties, and Applications of Hollow Micro-/Nanostructures", Chemical Reviews 2016, 116, 10983-11060, pubs.acs.org/CR, DOI:10.1021/acs.chemrev.5b00731, 78 pages.
M. D. Regulacio et al., "Toward Greener Methods of Producing Branched Metal Nanostructures", CrystEngComm, Royal Society of Chemistry, rsc.li/crystengcomm, DOI:10.1039/C9CE015618, 14 pages.
Byungkwon Lim et al., "Metal Nanocrystals with Highly Branched Morphologies", Minireviews, Nanostructures, Angew. Chem. Int. Ed., 2011, 50, 76-85, DOI:10.1002/anie.201002024, 10 pages.
Zhi-Ping Zhang et al., "Part I, Fundamentals and Structural Characterization of Shape-Controlled Bimetallic Nanostructions, Introduction of Bimetallic Nanostructures", 21 pages.
Mingchuan Luo et al., "Precious Metal Nanocrystals for Renewable Energy Electrocatalysis: structural design and controlled synthesis", Dalton Transactions 2020, 49, 267, Royal Society of Chemistry, DOI:10.1039/c9dt04351a, 7 pages.
Shi Shi et al., "Bifunctional Metal Nanocrystals for Catalyzing and Reporting on Chemical Reactions", In Situ Measurements, Minireviews, Angew. Chem. Int. Ed. 2020, 59, 3782-3792, DOI:10.1002/anie.201909615, 11 pages.
Yidong Zou et al., "Recent advances in amphiphilic block copolymer templated mesoporous metal-based materials: assembly engineering and applications", Chem Soc Rev, Royal Society of Chemistry, rsc.li/chem-soc-rev, DOI:10.1039/c9cs0034g, 36 pages.
Xiaoqian Wang et al., "Review of Metal Catalysts for Oxygen Reduction Reaction: From Nanoscale Engineering to Atomic Design", Chem 5, 1486-1511, Jun. 13, 2019, CellPress Reviews, https://doi.org/10.1016/j.chempr.2019.03.002, 26 pages.
Yan-Jie Wang et al., "Unlocking the door to highly active ORR catalysts for PEMFC applications: polyhedron-engineered Pt-based nanocrystals", Energy & Environmental Science, www.rsc.org/ees, DOI: 10.1039/c7EE02444D, 21 pages.
Younan Xia et al., "Seed-Mediated Growth of Colloidal Metal Nanocrystals", Metal Nanocrystals, Angew. Chem. Int. Ed. 2017, 56, 60-95, www.angewandte.org, DOI: 10.1002/anie.201604731, 36 pages.
Jian Liu et al., "Mesoporous Materials for Advanced Energy Storage and Conversion Technologies", CRC Press, http://www.crcpress.com, International Standard Book No. 13:978-1-4987-4799-8, LC record available at https://lccn.loc.gov/2016042509, 75 pages.
K. Eid et al., "Chapter 6, Nanoarchitectonic Metals", Supramaterials nanoarchitectonics, http://dx.doi.org/10.1016/B978-0-323-37829-1.00006-7, 37 pages.
Heba Ahmed et al., "Ultrafast assembly of swordlike Cu3(1,3,5-benzenetricarboxylate)n metal-organic framework crystals with exposed active metal sites", Nanoscale Horizons 2020, 5, 1050, Royal Society of Chemistry, DOI:10.1039/d0nh00171f, 9 pages.
Heba Ahmed et al., "Acoustomicrofluidic assembly of oriented and simultaneously activated metal-organic frameworks", Nature Communications (2019)10:2282, www.nature.com/naturecommunications, https://doi.org/10.1038/s41467-019-10173-5, 9 pages.
Heba Ahmed et al., "Ultrafast Acoustofluidic Exfoliation of Stratified Crystals", Communication, Advanced Materials 2018, 30, 1704756, www.advmat.de, DOI:10.1002/adma.201704756, 6 pages.

* cited by examiner

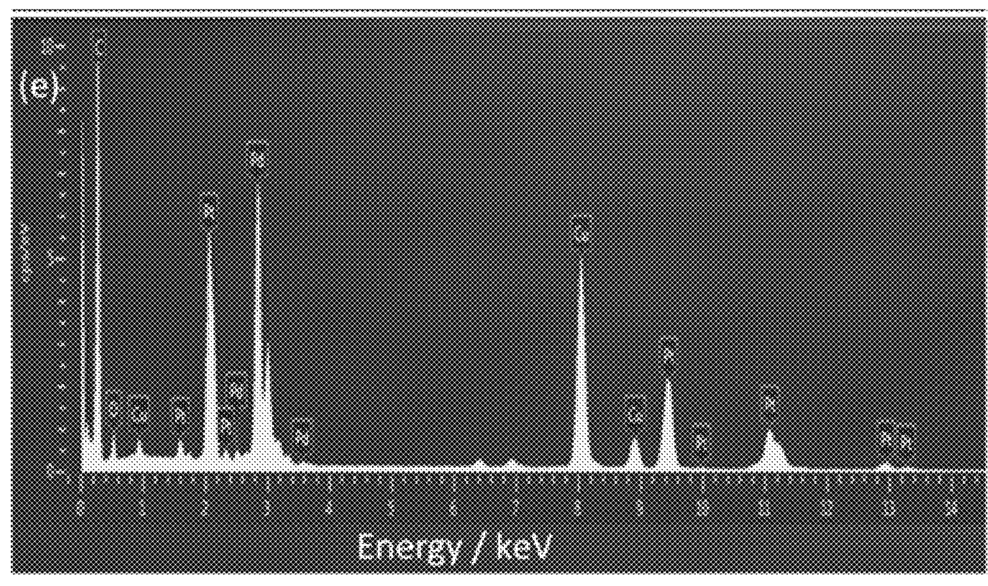
FIG. 4E
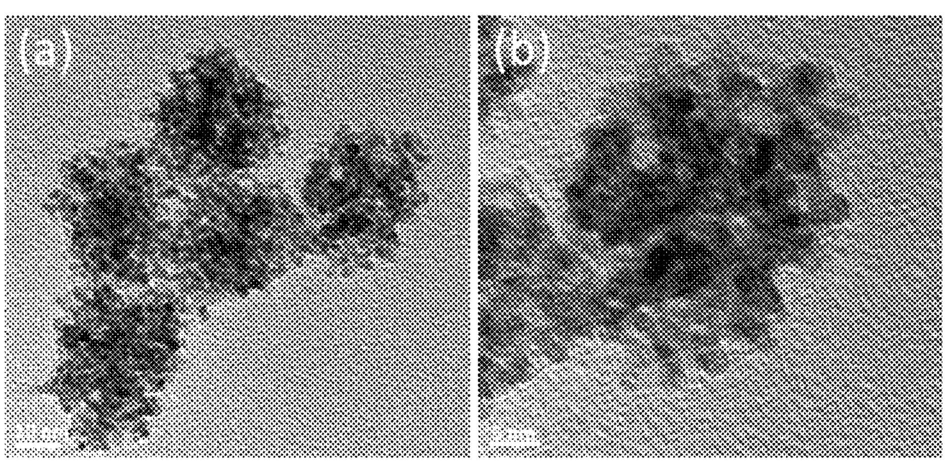
FIG. 5A
FIG. 5B
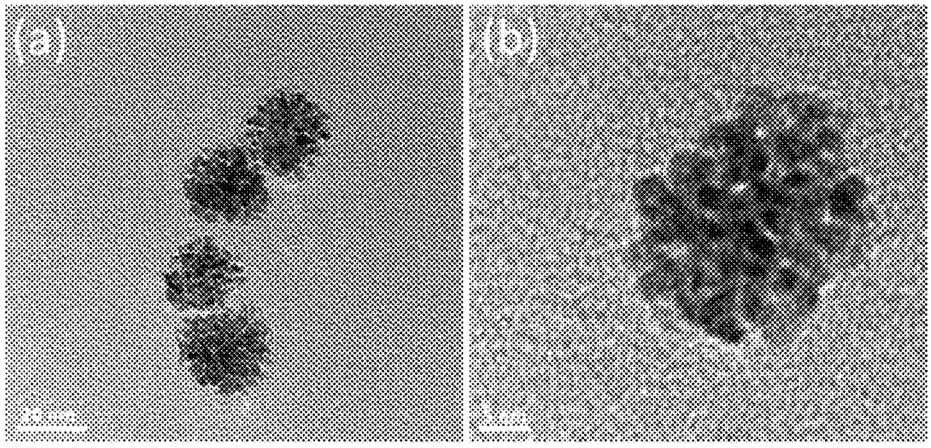
FIG. 6A
FIG. 6B

ACOUSTICMICROFLUIDIC DRIVEN ONE-STEP TEMPLATE-FREE ENGINEERING OF POROUS MULTIDIMENSIONAL MULTIMETALLIC NANOARCHITECTURES WITH TUNABLE SIZE, SHAPE, AND COMPOSITION

FIELD

Described herein is the controlled room temperature acousticmicrofluidic-based one-step template-free fabrication of porous multimetallic nanocrystals containing one or more 3d transition metals with tunable size, shape, and composition.

BACKGROUND

The sustained global energy consumption has increased substantially in the last decades. For this reason, a goal for next generation anodic oxidation and cathodic fuel cells (proton exchange membrane, methanol, ethanol, glycol, and water splitting) is that they will be green, efficient, and sustainable energy resources that exhibit high-energy yield with zero emissions. However, the commercialization of such fuel cells is mainly precluded by the intolerable-cost, inferior activity, durability, and scarcity of the noble metals (e.g., Pt, Pd, Ru, Ir, etc.) that are the main catalysts for fuel cell reactions. One approach for incorporating these metals into fuel cells is to mix them with more abundant, inexpensive tarnation metals with different porous structures. This method decreases the consumption of noble metals and enhances their catalytic activity and durability. Various methods have been developed for the rational synthesis of porous multimetallic nanocrystals with different shapes and compositions, including but not limited seed-mediated growth, solvothermal, template-based (soft, hard, and hydride), chemical reduction/oxidation, and galvanic replacement. However, these synthetic approaches typically include multiple complicated reaction steps, organic solvents, templates, and/or heating. Further, these methods are often characterized by multistep sluggish reaction kinetics. This can result in the separation, instead of the mixing, of metal precursors, which can hinder the catalytic efficiency. Alternatives include aqueous solution-based one-step methods that can be conducted at room temperature, but these often result in low yields, require several hours, and in some cases, require a template. Moreover, the fabrication of porous multimetallic nanocrystals containing one or more 3d transition metals with a high content (up to 30%) cannot occur at room temperature.

An acoustic-based synthetic method was used in the fabrication of different materials, such as metal-organic framework and two-dimensional materials, for example molybdenum disulfides (Ahmed, H., et al., *Nanoscale Horizons,* 2020, 5, 1050-1057; Ahmed, H., et al., *Nature communications,* 2019, 10, 1-9; and Ahmed, H., et al., *Advanced Materials,* 2018, 30, 1704756. However, an acoustic-driven rational one-step template-free design of porous multimetallic nanocrystals has not yet been described. One-step, template-free, room temperature controlled fabrication of porous multimetallic nanocrystals that contain one or more 3d transition metal with tunable size, shape, and composition is not possible. This synthesis is need.

SUMMARY

Described herein is a method for the synthesis of porous multimetallic nanocrystals comprising at least one 3d transition metal wherein the method comprises irradiating a mixture comprising at least one 3d transition metal precursor and at least one metal catalyst precursor with acoustic waves to form the nanocrystals. This synthesis is a facile, fast, one-step, template free acoustic-based synthesis for the rational fabrication of multimetallic (with one or more transition metals) nanocrystals in different porous structures (mesoporous, microporous, macrospore). This method engineers the shape and composition of nanocrystals in situ at the atomic level, which helps to optimize the catalytic performance. The nanocrystals made by the processes described herein combine the unique physiochemical merits of multimetallic properties (electronic, bi-functional, synergism) and inherent catalytic properties (porous, electron-rich density, high surface area to volume ratio and massive accessible active adsorption sites). Their shape and composition can easily be controlled in situ by changing the concentrations and ratios of the metal precursors and the reducing agent.

The structural (multidimensional, branched, multiparous) and compositional (mono-, binary, and ternary metals) properties of the nanocrystals prepared using the method described herein can be used for large-scale catalytic, sensing, and therapeutic applications.

BRIEF DESCRIPTIONS OF THE DRAWINGS

FIG. 1 is an image of the acoustomicrofluidic dipping setup. The acoustic nebulizer is dipped into a precursor solution in a 50 mL centrifuge tube. Upon acoustic excitation of the fluid, the nebulized droplets containing the formed multimetallic nanoparticles are condensed on the walls to be re-nebulised.

FIG. 2 is an image of the nebulization setup. Briefly, the precursor solutions are dispensed using a syringe onto an acoustic nebulizer made of a piezoelectric material, lithium niobate. Upon application of an electric field to the metal transducer patterned on the surface of the piezoelectric substrate, this generates acoustic waves. This causes breaking of the solution into smaller nebulized drops that contain the synthesized multimetallic nanoparticles.

FIG. 4E is the EDX analysis of the PtPdCu-1 PNDs.

FIG. 5A is a TEM image of PtPdCu-2 PNDs under 10 nm magnification.

FIG. 5B is a TEM image of PtPdCu-2 PNDs under 5 nm magnification.

FIG. 6A is a TEM image of PtCu-1 PNDs under 20 nm magnification.

FIG. 6B is a TEM image of PtCu-1 PNDs under 5 nm magnification.

DETAILED DESCRIPTION

Figures 1, 2:
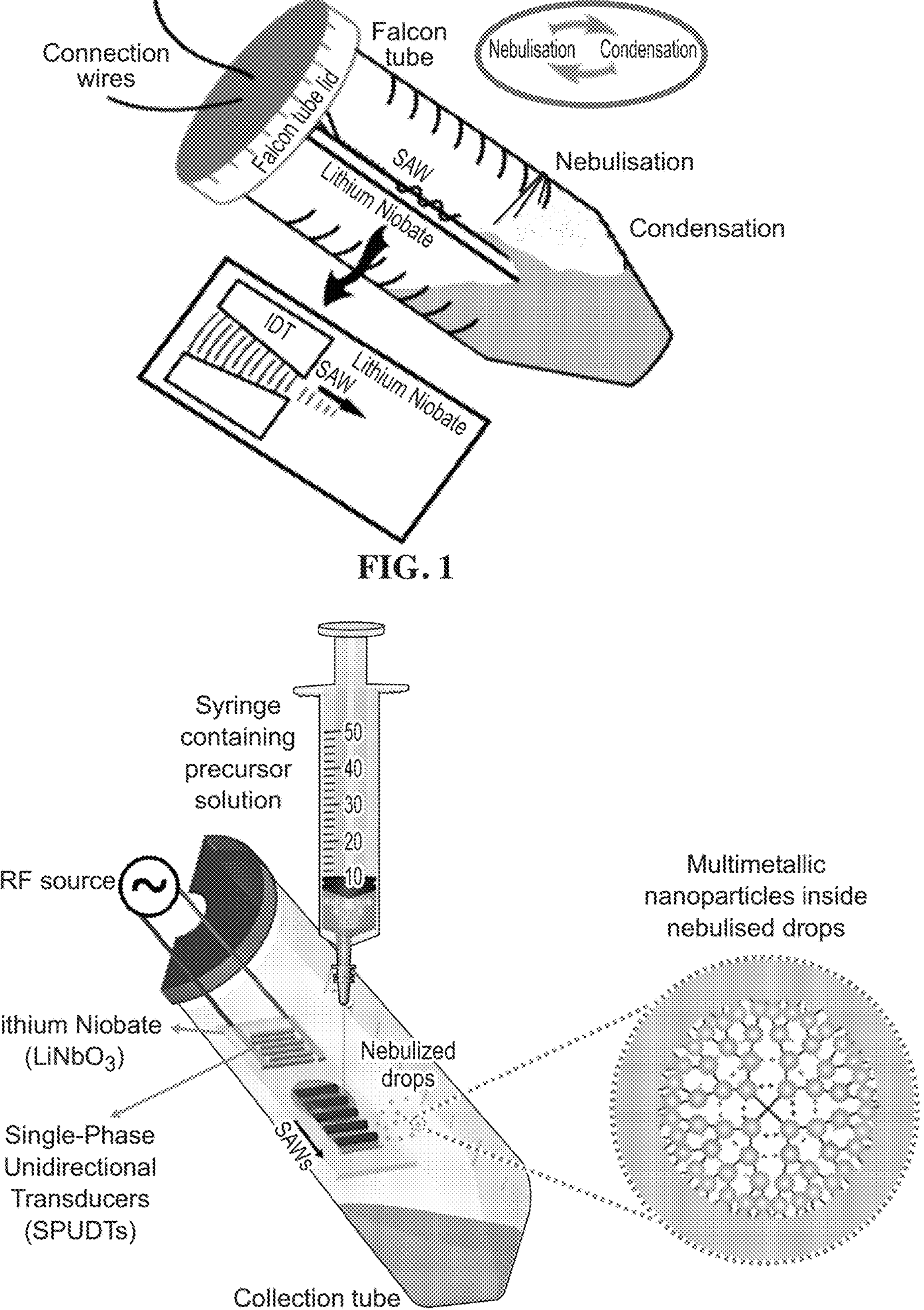

Room temperature controlled fabrication of porous multimetallic nanocrystals containing one or more 3d transition metals with tunable sizes, shapes, and compositions via a one-step template-free method is not possible. Described herein is the rational one-step design of porous (e.g., mesopore, macropore, micropore, individualized, or combined) multimetallic (e.g., mono, binary, ternary, tertiary) nanocrystals with the assistance of acoustic waves. This approach is facile, one-step, template-free, and fast (about 5-20 seconds). The shape and composition of the multimetallic nanoarchitectures can easily be engineered in situ, without the need for a multistep reaction, by adjusting the reactant concentration and acoustic parameters. The nanocrystals formed by the processes described herein possess structural and compositional properties ideal for multidiscipline electrocatalytic applications (e.g. oxidation or reduction and/or redox), sensing, and therapeutic applications.

Distinct from traditional processes for fabrication of porous or non-porous multimetallic nanocrystals, the acoustic-mediated synthetic method described herein allows for fast (5-20 sec) fabrication of multimetallic nanocrystals containing one or more 3d transition metals (for example, Cu, Ni, or Co) at room temperature (25° C.). This method is facile, one-step (no metal seeds or multistep reaction), green (no hazardous chemicals or organic solvents), and feasible for large-scale applications. Further, it is template-free (no soft, hard, or hybrid templates) and can be conducted with or without reducing agents. It can also be conducted with noble-metals with and without transition metals groups 3 to 12 on the periodic table.

The method can afford various porous multimetallic nanocrystals of different structures (mesoporous, microporous, and macroporous, individual or combined) and multidimensional nanoarchitecture features (nanodendrites, cubic, flowers, nanocages, etc.). Typically, the nanocrystals are about 10-30 nm in size and can be zero-dimensional, one-dimensional, or multidimensional. Further, multimetallic alloy, core-shell, and intermetallic nanostructures can be synthesized, and in certain embodiments, the composition of the multimetallic nanocrystals contain up to 50% w/w of the transition metal(s) at room temperature.

Definitions

As used herein, the term "about," when qualifying a number, e.g., 15% w/w, refers to the number qualified and optionally the numbers included in a range about that qualified number that includes ±10% of the number. For example, about 15% w/w includes 15% w/w as well as 13.5% w/w, 14% w/w, 14.5% w/w, 15.5% w/w, 16% w/w, or 16.5% w/w. For example, "about 75° C.," includes 75° C. as well 68° C., 69° C., 70° C., 71° C., 72° C., 73° C., 74° C., 75° C., 76° C., 77° C., 78° C., 79° C., 80° C., 81° C., 82° C., or 83° C. For example, evaporating a solvent at about 80° C. includes evaporating a solvent at 79° C., 80° C., or 81° C.

As used herein, "selected from the group consisting of" refers to a single member from the group, more than one member from the group, or a combination of members from the group. A member selected from the group consisting of A, B, and C includes, for example, A only, B only, or C only, as well as A and B, A and C, B and C, as well as A, B, and C.

As used herein, a "poloxamer" is a nonionic triblock copolymer composed of a central hydrophobic polyoxypropylene (poly(propylene oxide, PPO)) chain and two hydrophilic polyoxyethylene (poly(ethylene oxide, PEO)) chains arranged as PEO-PPO-PEO.

As used herein, "surface acoustic waves (SAWs)" are acoustic waves traveling along the surface of a material that exhibits elasticity.

As used herein, a "nanocrystal" is a crystalline particle with at least one dimension measuring less than 1000 nanometers. Typically, the nanocrystals described herein are about 10-30 nm in size and can be zero-dimensional, one-dimensional, or multidimensional.

As used herein, a "3d transition metal" is an element in the fourth period of the periodic table: scandium, titanium, vanadium, chromium, manganese, iron, cobalt, nickel, copper, and zinc.

Synthesis of Porous Multimetallic Nanocrystals

In a first aspect, the porous multimetallic nanocrystals comprising at least one 3d transition metal are synthesized by a process that comprises the following steps:

a) mixing at least one 3d transition metal precursor and at least one metal catalyst precursor in an aqueous solution of a non-ionic copolymer or surfactant and optionally adding a reducing agent to form a mixture;

b) continuously irradiating the mixture with acoustic waves at room temperature for no more than about 30 seconds to afford porous multimetallic nanocrystals; and c) isolating and purifying the porous multimetallic nanocrystal.

In a second aspect, the method comprises the following steps:

a) mixing at least one 3d transition metal precursor and at least one metal catalyst precursor in a non-ionic copolymer and optionally adding a reducing agent to form a mixture;

b) dispensing droplets of the mixture onto the surface of a surface acoustic waves (SAW) device to form porous multimetallic nanocrystals; and c) purifying and isolating the porous multimetallic nanocrystal.

In one embodiment of the first or second aspect, the at least one 3d transition metal precursor is selected from $CuCl_2$, $NiCl_2$, $CoCl_2$, $FeCl_2$, $Cu(NO_3)_2$, $Fe(NO_3)_3$, and $Co(NO_3)_2$ or a hydrate thereof. In one embodiment of the first or second aspect, the at least one 3d transition metal precursor is selected from $CuCl_2 \cdot 2H_2O$, $NiCl_2 \cdot 6H_2O$, $CoCl_2 \cdot 6H_2O$, $FeCl_2 \cdot 2H_2O$, $Cu(NO_3)_2 \cdot 2H_2O$, $Cu(NO_3)_2 \cdot 3H_2O$, $Fe(NO_3)_3 \cdot 9H_2O$, and $Co(NO_3)_2 \cdot 6H_2O$. In one embodiment of the first or second aspect, the at least one 3d transition metal precursor is $CuCl_2 \cdot 2H_2O$ in step (a).

In one embodiment of the first or second aspect, the at least one metal catalyst precursor is selected from $K_2PtCl_4$ and $K_2PdCl_6$ in step (a). In one embodiment of the first or second aspect, the at least one metal precursor is $K_2PtCl_4$ in step (a). In one embodiment of the first or second aspect, the at least one metal precursor is $K_2PdCl_6$ in step (a).

In one embodiment of the first or second aspect, $K_2PtCl_4$, $K_2PdCl_6$, and $CuCl_2$ $2H_2O$ are mixed together in step (a). In one embodiment of the first or second aspect, $K_2PtCl_4$ and $CuCl_2 \cdot 2H_2O$ are mixed together in step (a). In one embodiment of the first or second aspect, $K_2PdCl_6$ and $CuCl_2 \cdot 2H_2O$ are mixed together in step (a).

In one embodiment of the first or second aspect, the non-ionic copolymer is a poloxamer. In one embodiment of the first or second aspect, the poloxamer has a molecular weight between about 10,000 g/mol and 20,000 g/mol, between about 10,000 g/mol and 15,000 g/mol, or between about 10,000 g/mol and 13,000 g/mol. In one embodiment of the first or second aspect, the poloxamer has a molecular weight of about 12,500 g/mol. In one embodiment of the first or second aspect, the poloxamer is Pluronic F127. In one embodiment of the first or second aspect, the poloxamer is Pluronic P123. In one embodiment of the first or second aspect, the non-ionic copolymer is polyvinylpyrrolidone. In one embodiment of the first or second aspect, the non-ionic surfactant is a polyoxyethylene, for example Brij™-35. In an alternative embodiment, an ionic co-polymer is used in step (a). Non-limiting examples of ionic co-polymers include cetrimonium bromide, cetyltrimethyl ammonium chloride, and benzyl hexadecyl dimethyl ammonium chloride.

In one embodiment of the first or second aspect, a reducing agent is added in step (a). In one embodiment of the first or second aspect, a reducing agent is not added in step (a). In one embodiment of the first or second aspect, a reducing agent is added in step (a) and the reducing agent is selected from L-ascorbic acid, formic acid, hydrazine, sodium borohydride, hydroxylamine, citric acid, a plant extract, a sugar solutions, glycerol, a polyol, hydrogen gas, vitamin E, glutathione, N-acetylcysteine, biquinol, and alpha-Lipoic Acid. In one embodiment of the first or second aspect, the reducing agent is L-ascorbic acid In one embodiment of the first or second aspect, step (a) comprises mixing a Pt precursor, a Pd precursor, and a Cu precursor with an aqueous solution of a poloxamer and adding a reducing agent. In one embodiment of the first or second aspect, step (a) comprises mixing $K_2PtCl_4$, $K_2PdCl_6$, and $CuCl_2 \cdot 2H_2O$ with an aqueous solution of Pluronic F127 and adding a L-ascorbic acid.

In one embodiment of the first or second aspect, step (a) comprises mixing a Pt precursor, a Pd precursor, and a Cu precursor with an aqueous solution of a poloxamer. In one embodiment of the first or second aspect, step (a) comprises mixing $K_2PtCl_4$, $K_2PdCl_6$, and $CuCl_2 \cdot 2H_2O$ with an aqueous solution of Pluronic F127.

In one embodiment of the first or second aspect, step (a) comprises mixing a Pt precursor and a Cu precursor with an aqueous solution of a poloxamer and adding a reducing agent. In one embodiment of the first or second aspect, step (a) comprises mixing $K_2PtCl_4$ and $CuCl_2 \cdot 2H_2O$ with an aqueous solution of Pluronic F127 and adding a L-ascorbic acid.

In one embodiment of the first or second aspect, step (a) comprises mixing a Pt precursor and a Cu precursor with an aqueous solution of a poloxamer. In one embodiment of the first or second aspect, step (a) comprises mixing $K_2PtCl_4$ and $CuCl_2 \cdot 2H_2O$ with an aqueous solution of Pluronic F127.

In one embodiment of the first aspect, the acoustic waves are generated from an acoustic nebulizer. In one embodiment, the acoustic nebulizer is operating at a frequency of about 1-20 MHz and an applied voltage of about 1-20 $V_{rms}$. In one embodiment, the frequency is about 1-10 MHz, about 10-20 MHz, about 5-15 MHz, about 8-12 MHz, about 10-15 MHz, or about 15-20 MHz. In one embodiment, the frequency is about 10 MHz. In one embodiment, the applied voltage is about 1-10 $V_{rms}$, about 10-20 $V_{rms}$, about 5-15 $V_{rms}$, about 8-12 $V_{rms}$, about 10-15 $V_{rms}$, or about 15-20 $V_{rms}$. In one embodiment, the applied voltage is about 9-10 $V_{rms}$. In one embodiment, the applied voltage is about 9 $V_{rms}$. In one embodiment, the acoustic nebulizer is operating at a frequency of about 10 MHz and an applied voltage of about 9 $V_{rms}$.

In one embodiment of the first aspect, the acoustic waves are generated from a HYDRA nebulization device that comprises a single-phase unidirectional interdigital transducer (SPUDT) as described in FIG. 1. In one embodiment of the first aspect, the acoustic waves are generated by dipping the acoustic nebulizer in the mixture of step (a) wherein the SPUDT does not contact the mixture.

In one embodiment of the first aspect, the acoustic waves are generated for no more than about 30 seconds, no more than about 25 seconds, no more than about 20 seconds, no more than about 15 seconds, no more than about 10 seconds, or no more than about 5 seconds. In one embodiment of the first aspect, the acoustic waves are generated for no more than about 20 seconds. In one embodiment of the first aspect, the acoustic waves are generated for no more than about 10 seconds. In one embodiment of the first aspect, the acoustic waves are generated for no more than about 5 seconds.

In one embodiment of the first or second aspect, the porous multimetallic nanocrystals are isolated by centrifugation. In one embodiment of the first or second aspect, the porous multimetallic nanocrystals are isolated by centrifugation and the centrifugation is for at least 10,000 rpm for about 20 minutes. In a further embodiment, the porous multimetallic nanocrystal are washed with water.

In one embodiment of the first or second aspect, the isolated nanocrystals comprise one 3d transition metal. In one embodiment of the first or second aspect, the isolated nanocrystals comprise two 3d transition metals. In one embodiment of the first or second aspect, the isolated nanocrystals comprise three 3d transition metals. In one embodiment of the first or second aspect, the at least one 3d transition metal is copper (Cu). In one embodiment of the first or second aspect, the at least one 3d transition metal is nickel (Ni). In one embodiment of the first or second aspect, the at least one 3d transition metal is cobalt (Co).

In one embodiment of the first or second aspect, the isolated nanocrystals comprise about 50% w/w of the 3d transition metal, about 45% w/w of the 3d transition metal, about 40% w/w of the 3d transition metal, about 35% w/w of the 3d transition metal, about 30% w/w of the 3d transition metal, about 25% w/w of the 3d transition metal, or about 20% w/w of the 3d transition metal. In one embodiment of the first or second aspect, the isolated nanocrystals comprise about 50% w/w of the 3d transition metal. In one embodiment of the first or second aspect, the isolated nanocrystals comprise about 50% w/w Cu.

In one embodiment of the first or second aspect, the isolated nanocrystals further comprise at least one metal selected from palladium (Pd), platinum (Pt), gold (Au), silver (Ag), iridium, (Ir), rhodium (Rh), and ruthenium (Ru). In one embodiment of the first or second aspect, the isolated nanocrystals further comprise Pd. In one embodiment of the first or second aspect, the isolated nanocrystals further comprise Pt. In one embodiment of the first or second aspect, the isolated nanocrystals further comprise Pd and Pt.

In one embodiment of the first or second aspect, the isolated nanocrystals comprise Pd and Cu. In one embodiment of the first or second aspect, the isolated nanocrystals comprise Pt and Cu. In one embodiment of the first or second aspect, the isolated nanocrystals comprise Pd, Pt, and Cu. In one embodiment of the first or second aspect, the isolated nanocrystals comprise (i) at least one metal selected from palladium (Pd), platinum (Pt), gold (Au), silver (Ag), iridium, (Ir), rhodium (Rh), and ruthenium (Ru) and (ii) Cu.

In one embodiment of the first or second aspect, the diameter of the isolated nanocrystals is about 10 nm to 30 nm. In one embodiment of the first or second aspect, the diameter of the isolated nanocrystals is about 15 nm to 25 nm. In one embodiment of the first or second aspect, the diameter of the isolated nanocrystals is about 18 nm to 25 nm. In one embodiment of the first or second aspect, the diameter of the isolated nanocrystals is about 19 nm to 25 nm. In one embodiment of the first or second aspect, the diameter of the isolated nanocrystals is about 22 nm. In one embodiment of the first or second aspect, the diameter of the isolated nanocrystals is about 16 nm to 20 nm. In one embodiment of the first or second aspect, the diameter of the isolated nanocrystals is about 18 nm. In one embodiment of the first or second aspect, the diameter of the isolated nanocrystals is about 18 nm to 24 nm. In one embodiment of the first or second aspect, the diameter of the isolated nanocrystals is about 21 nm.

In one embodiment of the first or second aspect, the isolated nanocrystals are zero-dimensional. In one embodiment of the first or second aspect, the isolated nanocrystals are one-dimensional. In one embodiment of the first or second aspect, the isolated nanocrystals are multi-dimensional.

In one embodiment of the first or second aspect, the architecture of the isolated nanocrystals is selected from nanodendrite, cubic, flower, and nanocage.

In one embodiment of the first or second aspect, the diameter of the pores in the isolated nanocrystals is about 1 to 10 nm, about 1 to 8 nm, about 1 to 6 nm, or about 1 to 4 nm.

In one embodiment of the first or second aspect, the diameter of the isolated nanocrystals is about 17 to 23 nm and the diameter of the pores in the isolated nanocrystals is about 1 to 6 nm. In one embodiment of the first or second aspect, the isolated nanocrystals are branched and the average diameter of the branches is about 1 to 7 nm, about 2 to 5 nm, or about 3 to 4 nm.

In one embodiment of the first or second aspect, the diameter of the isolated nanocrystals is about 19 to 25 nm and the diameter of the pores in the isolated nanocrystals is about 1 to 7 nm. In one embodiment of the first or second aspect, the diameter of the isolated nanocrystals is about 16 to 22 nm and the diameter of the pores in the isolated nanocrystals is about 1 to 3 nm. In one embodiment of the first or second aspect, the diameter of the isolated nanocrystals is about 18 to 24 nm and the diameter of the pores in the isolated nanocrystals is about 1 to 5 nm. In a further embodiment, the nanocrystals are arranged in a flower-like nanostructure.

In one embodiment of the first or second aspect, the isolated nanocrystals comprise Pt, Pd, and Cu and atomic ratio of Pt/Pd/Cu in the isolated nanocrystals is about 4/2/1.5 as measured by ICP analysis. In one embodiment of the first or second aspect, the atomic ratio of Pt/Pd/Cu in the isolated nanocrystals is about 3.6/3.1/3.3 as measured by ICP analysis. In one embodiment of the first or second aspect, the atomic ratio of Pt/Pd/Cu in the isolated nanocrystals is about 3.7/2.6/2.6 as measured by ICP analysis. In one embodiment of the first or second aspect, the atomic ratio of Pt/Pd/Cu in the isolated nanocrystals is about 4.1/2.0/1.5 as measured by ICP analysis.

In one embodiment of the first or second aspect, the isolated nanocrystals comprise Pt and Cu and the atomic ratio of Pt/Cu in the isolated nanocrystals is about 2/0.5 as measured by ICP analysis. In one embodiment of the first or second aspect, the atomic ratio of Pt/Cu in the isolated nanocrystals is about 1.9/0.65 as measured by ICP analysis. In one embodiment of the first or second aspect, the atomic ratio of Pt/Cu in the isolated nanocrystals is about 2.3/0.42 as measured by ICP analysis. In one embodiment of the first or second aspect, the atomic ratio of Pt/Cu in the isolated nanocrystals is about 20.3/15.1 as measured by ICP analysis.

EXAMPLES

Potassium tetrachloroplatinate (II) ($K_2PtCl_4$, 99.99%), ruthenium(III) chloride ($RuCl_3$, 99.99%), copper (II) chloride dihydrate ($CuCl_2$ $2H_2O$), pluronic F127, potassium hexachloropalladate (IV) ($K_2PdCl_6$), L-ascorbic acid (AA), and poly(vinylpyrrolidone) (PVP, MW=40,000) were purchased from Sigma-Aldrich Chemie GmbH (Munich, Germany). All chemicals were of analytical grade and used as received.

Acoustomicrofluidic Device Fabrication

Surface acoustic waves (SAWs) are acoustic waves traveling along the surface of a material that exhibits elasticity. A HYDRA nebulization device, on which surface reflected bulk waves (hybrid surface SAWs) and bulk electromechanical waves propagate as energy sources to induce nebulization of a liquid, was used. These waves can be used to drive microfluidic actuation. Due to the mismatch of sound velocities in the substrate, in which the acoustic wave propagates, and the fluid in contact therewith, the acoustic waves can be transferred to the fluid. This can, in turn, create inertial forces in the fluid that can be used to spilt water.

The device generally comprises at least one metal electrode, which is the single-phase unidirectional interdigital transducer (SPUDT). The interdigital transducer is disposed on a piezoelectric elastic substrate (hereinafter piezoelectric substrate). An electric signal is converted by the interdigital transducer and reconverted into and from a surface wave by exploiting the piezoelectric effect of the piezoelectric substrate. The piezoelectric substrate may, for example be formed of quartz, lithium niobite, lithium tantalite or the like. Surface acoustic wave devices are typically fabricated by photolithography. In brief, the HYDRA devices were fabricated by patterning 40 interdigital transducer (IDT) finger pairs comprising 10 nm chromium and 1.5 μm aluminum films with 3.9 mm aperture widths on a 500 μm thick 128°-YX double-sided polished single-crystal piezoelectric lithium niobate ($LiNbO_3$) substrate (Roditi Ltd., London, UK) using UV lithography. Upon activation by SAW, droplets are immediately nebulized into aerosol droplets that contain the multimettalic nanoparticles.

Example 1: Synthesis of Porous Nanocrystals

Synthesis 1. Preparation of Porous PtPdCu-1 Nanocrystals Via Acousticmicrofluidic-Dipping Porous branched PtPd nanocrystals (PtPdCu-1 PNDs) were prepared by mixing 4 mL of an aqueous solution of $K_2PtCl_4$ (20 mM) with 2.5 mL of an aqueous solution of $K_2PdCl_6$ (20 mM), and 2 mL of an aqueous solution of $CuCl_2$ $2H_2O$ (20 mM) in a 1 mL aqueous solution of Pluronic F127 (0.1 g). the mixture was continuously excited by acoustic waves generated from a 10 MHz acoustic nebulizer operating at an applied voltage of 9 $V_{rms}$ and 1 mL of an aqueous L-ascorbic acid solution (0.4 M) was added with the excitation. The nebulizer was directly dipped inside the solution in such a way that the solution did not come in contact with the IDTS. The acoustic waves were generated by applying a sinusoidal electrical input at the resonant frequency (f=10 MHz) with a signal generator (SML01; Rhode & Schwarz, North Ryde, NSW, Australia) and 5 W amplifier (LYZ-22+, Mini Circuits, Brooklyn, NY, USA) as shown in FIG. 1. The solution color quickly changed from pale-yellow to deep black. During the irradiation with the acoustic waves, the nanocrystals condense on the walls of the reaction vessel. The microchip was removed from the solution 5 seconds after the L-ascorbic acid was added and the condensed PtPd PNDs were isolated and purified by consecutive centrifugation/washing cycles at 10,000 rpm for 20 minutes using DDI water.

Alternatively, the multimettalic particles can be prepared by dispensing the precursor solution in the form of drops onto the surface of a piezoelectric substrate subjected to surface acoustic waves, i.e., the substrate of a SAW device. When the drops make contact with the piezoelectric substrate of the SAW device, the droplets break up into smaller drops under the extreme mechanical accelerations, and thus can be nebulized. This is known as an atomisation process. The resulting smaller drops containing the produced multimetallic particles are collected in a suitable collection vessel, such as a 50 mL centrifuge tube (FIG. 2).

Synthesis 2. Preparation of Porous PtPdCu-2 Nanocrystals Via Acousticmicrofluidic-Dipping without Reducing Agent Porous branched PtPdCu nanocrystals (PtPdCu-2 PNDs) were synthesized by mixing 4 mL of an aqueous solution of $K_2PtCl_4$ (20 mM) with 2.5 mL of an aqueous solution of $K_2PdCl_6$ (20 mM), and 2 mL of an aqueous solution of $CuCl_2 \cdot 2H_2O$ (20 mM) in a 1 mL aqueous solution of Pluronic F127 (0.1 g) under continuous acoustic wave excitation as described above. The solution color quickly changed from pale-yellow to deep black, and after 20 seconds, the microchip was removed from the solution and PtPdCu PNDs were isolated and purified as described in Synthesis 1.

Synthesis 3. Preparation of Porous PtCu-1 Nanocrystals Via Acousticmicrofluidic-Dipping Porous branched PtCu nanocrystals (PtCu-1 PNDs) were prepared by mixing 3 mL of an aqueous solution of $K_2PtCl_4$ (20 mM) with 1 mL of an aqueous solution of $CuCl_2$ $2H_2O$ (20 mM) in a 1 mL aqueous solution of Pluronic F127 (0.01 g). An aqueous solution (0.1 M) of L-ascorbic acid (4 mL) was directly added under continuous acoustic waves excitation as described above. The solution color quickly changed from pale-yellow to deep black. After 5 seconds, the microchip was removed from the solution and PtCu PNDs were isolated and purified by centrifugation/washing cycles as mentioned above.

Synthesis 4. Preparation of Porous PtCu-2 Nanocrystals Via Acousticmicrofluidic-Dipping without Reducing Agent Porous branched PtCu nanocrystals (PtPd-2 PNDs) were prepared by mixing 3 mL of an aqueous solution of $K_2PtCl_4$ (20 mM) with 1 mL of an aqueous solution of $CuCl_2$ $2H_2O$ (20 mM) in al mL aqueous solution of Pluronic F127 (0.01 g) under continuous acoustic waves excitation as described above. The solution color quickly changed from pale-yellow to deep black. After 5 seconds, the microchip was removed from the solution and PdCu PNDs were isolated and purified by centrifugation/washing cycles as mentioned above.

Synthesis 5. Preparation of Porous PtCu-3 Nanocrystals Via Acousticmicrofluidic-Dipping Porous branched PtCu nanocrystals (PtPd-3 PNDs) were prepared by mixing 3 mL of an aqueous solution of $K_2PtCl_4$ (20 mM) with 1 mL of an aqueous solution of $CuCl_2$ $2H_2O$ (20 mM0) and a 1 mL aqueous solution of Pluronic F127 (0.01 g) under continuous acoustic waves excitation through the atomization of the reactants over the microchip as shown in FIG. 2. The solution color quickly changed from pale-yellow to deep black. PdCu PNDs were isolated and purified by centrifugation/washing cycles as mentioned above.

Example 2: Characterization of Porous Nanocrystals

Scanning electron microscopy (SEM) was conducted using a Hitachi S-4800 (Hitachi, Tokyo, Japan). Transmission electron microscopy was carried out on a transmission electron microscope (TE, TecnaiG220, FEI, Hillsboro, OR, USA), energy dispersive spectrometer (EDS), and high-angle annular dark-field scanning TEM (HAADF-STEM) at 200 kV. X-ray photoelectron spectroscopy (XPS) spectra were measured on a Kratos Axis (Ultra DLD XPS Kratos, Manchester, UK) equipped with a monochromatic Al Kα radiation source (1486.6 eV) under a UHV environment (ca. $5\times10^{-9}$ Torr). Inductively coupled plasma optical emission spectrometry ((ICP-OES), Thermo Scientific iCAP6300, Thermo Fisher Scientific, US) was used for the compositional analysis.

Figures 3A, 3B:
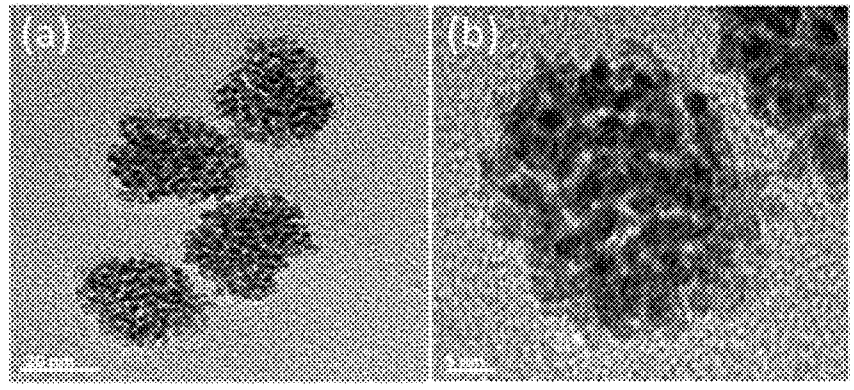
FIG. 3A is a TEM image of PtPdCu-1 PNDs under 20 nm magnification.
FIG. 3B is a TEM image of PtPdCu-1 PNDs under 5 nm magnification.
Figure 3C:
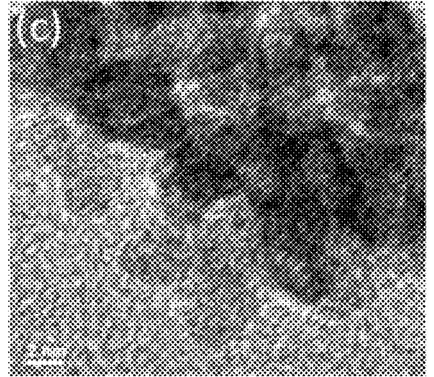
FIG. 3C is a TEM image of PtPdCu-1 PNDs under 2 nm magnification.

FIGS. 3A-3C are TEM images of PtPdCu-1 PDNs formed by dipping the microchip into a solution of the metal precursors ascorbic acid as described in Example 1. The PtPdCu PDNs assembled in a well-defined porous nanostructures with branched surfaces (FIG. 3A). The size of PtPdCu PDNs was in the range of (20±3 nm) with pore diameters in the range of 1-6 nm (FIG. 3B). The surface of the PtPdCu PDNs were characterized by multiple branches with average diameters of 2-5 nm. The resolved lattice fringes do not show any crystalline defects (FIG. 3C).

Figures 4A, 4B, 4C, 4D:
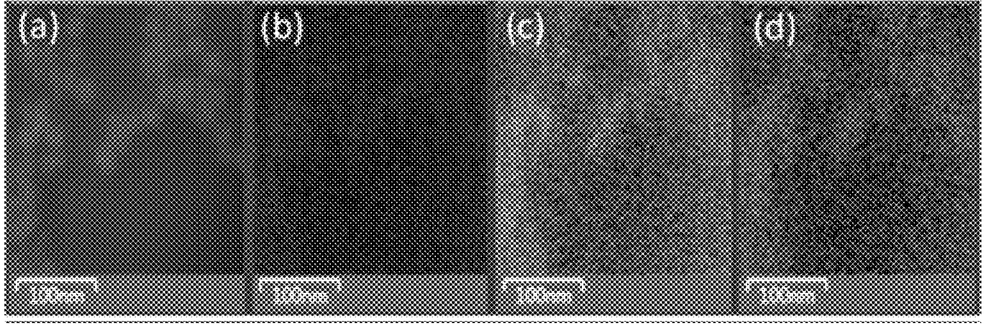
FIG. 4A is a dark-field TEM image of PtPdCu-1 PNDs.
FIG. 4B is the elemental mapping of Cu in the PtPdCu-1 PNDs.
FIG. 4C is the elemental mapping of Pd in the PtPdCu-1 PNDs.
FIG. 4D is the elemental mapping of Pt in the PtPdCu-1 PNDs.

The EDS elemental mapping analysis was used to confirm the composition of the nanocrystals. FIGS. 4A-4D show the formation of PtPdCu nanocrystals composite particles and this is in line with the EDX result (FIG. 4E). The atomic ratios of Pt/Pd/Cu were about 3.6/3.1/3.3, respectively. This was furthered confirmed with ICP analysis (Table 1).

TABLE 1

ICP analysis of nanocrystals

| Nanocrystals | Pd3242 (ppm) | Pt2036 (ppm) | Cu3247 (ppm) |
|---|---|---|---|
| PtPdCu-1 PNDs | 2.643 | 3.752 | 2.619 |
| PtPdCu-2 PNDs | 2.0 | 4.1 | 1.5 |
| PtCu-1 PNDs | | 1.925 | 0.6541 |
| PtCu-2 PNDs | | 2.322 | 0.42 |
| PtCu-3 PNDs | | 20.25 | 15.11 |

FIG. 5A and FIG. 5B are TEM images of the PtPdCu-2 PNDs prepared as described in Synthesis 2. The nanocrystals had an average diameter of 22±3 nm (FIG. 5A) and were porous and with a branched surface. The average pore was 1-7 nm (FIG. 5B).

FIG. 6A and FIG. 6B are TEM image of porous PtCu-1 PNDs prepared as described in Synthesis 3. The nanocrystals were formed in a flower-like nanostructure with an average size of 18±2 nm (FIG. 6A) with multiple arms on the surface and inbuilt pores in the range of 1-3 nm (FIG. 6B).

Figures 7A, 7B:
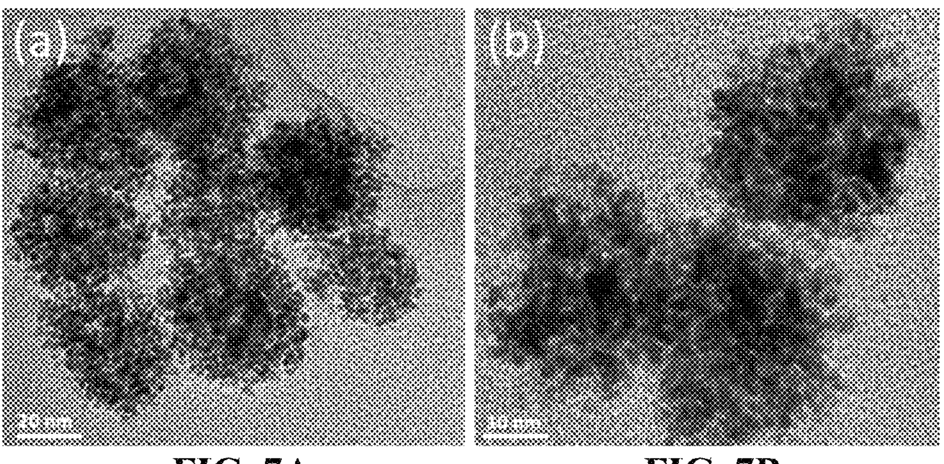
FIG. 7A is a TEM image of PtCu-2 PNDs under 20 nm magnification.
FIG. 7B is a TEM image of PtCu-2 PNDs under 5 nm magnification.

FIG. 7A and FIG. 7B are TEM images of porous PtCu-2 PNDs prepared as described in Synthesis 4. The nanocrystals were obtained in a flower-like nanostructure with an average size of 21±3 nm (FIG. 7A) with branched surface and various pores in the range of 1-5 nm (FIG. 7B).

Figures 8A, 8B:
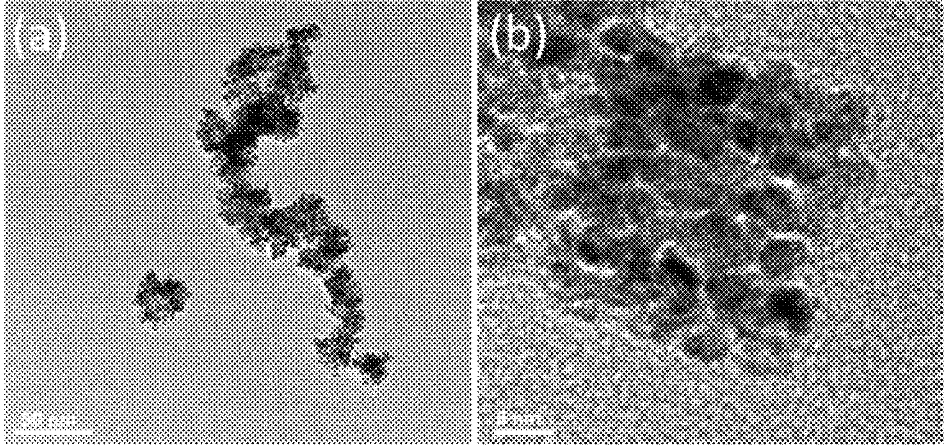
FIG. 8A is a TEM image of PtCu-3 PNDs under 50 nm magnification.
FIG. 8B is a TEM image of PtCu-3 PNDs under 5 nm magnification.

FIG. 7A and FIG. 7B are TEM images of porous PtCu-3 PNDs prepared as described in Synthesis 5. PtCu nanocrystals were assembled in a cage-belt structure with an average length of 500±50 nm and width of 18±2 nm in width (FIG. 8A). The cage-belt shape was comprised of various assembled cubic branched nanocages with an average diameter of 18±2 nm containing hollow cages of nearly 5±2 nm in addition to other mesoporous structures.

Figure 9A:
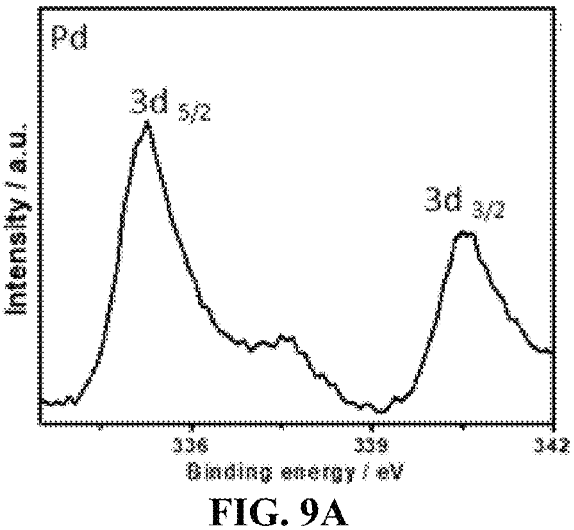
FIG. 9A is a high-resolution XPS spectra of Pd 3d in the PtPdCu-1 PNDs.
Figure 9B:
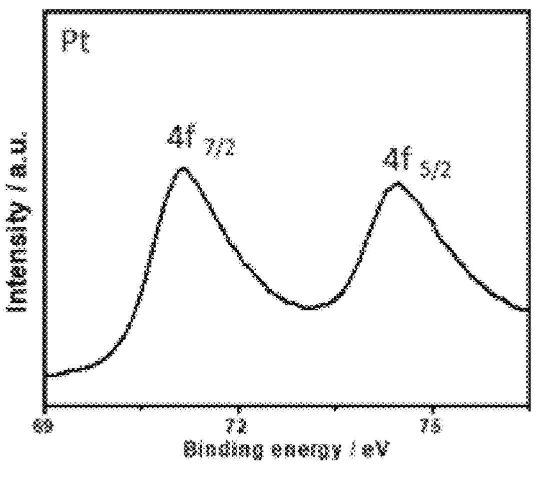
FIG. 9B is a high-resolution XPS spectra of Pt 4f in the PtPdCu-1 PNDs.
Figure 9C:
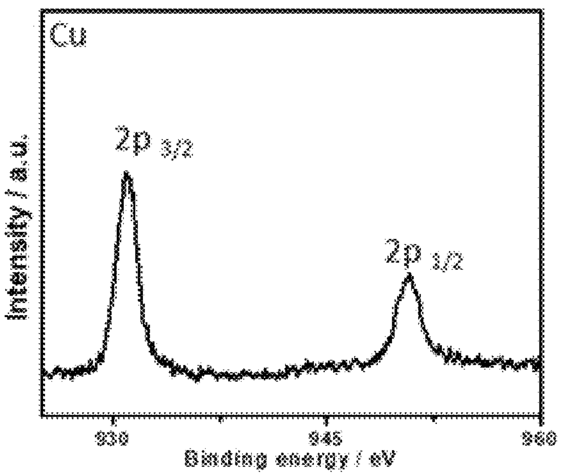
FIG. 9C is a high-resolution XPS spectra of Cu 2p in the PtPdCu-1 PNDs.

Electronic structures and surface compositions of the formed nanocrystals were investigated by XPS analysis. FIGS. 9A-9C show high-resolution XPS spectra of PtPdCu-1 PNDs, confirming the presence of Pt 4f (Pt $4f_{7/2}$ at 71.1 eV and Pt $4f_{5/2}$ at 74.5 eV), Pd 3d (Pd $3d_{5/2}$ at 335.1 eV and Pd $3d_{3/2}$ at 340.5 eV), and Cu 2p (Cu $2p_{3/2}$ at 933.2 eV and Cu $2p_{1/2}$ at 953.1 eV). The atomic contents of Pt, Pd, and Cu were about 3.6, 3.1, and 3.3, respectively.

Figure 10A:
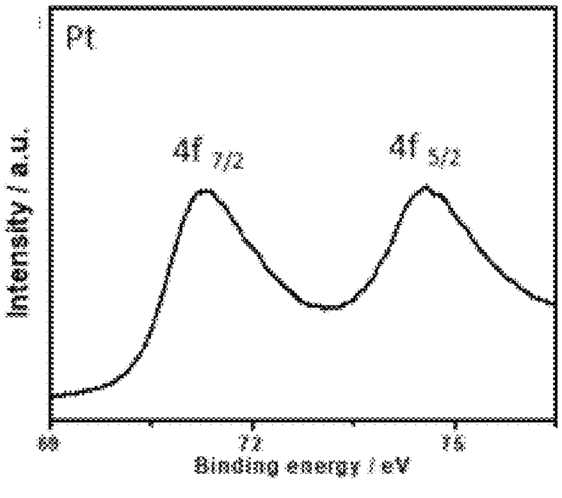
FIG. 10A is a high-resolution XPS spectra of Pt 4f in the PtPdCu-2 PNDs.
Figure 10B:
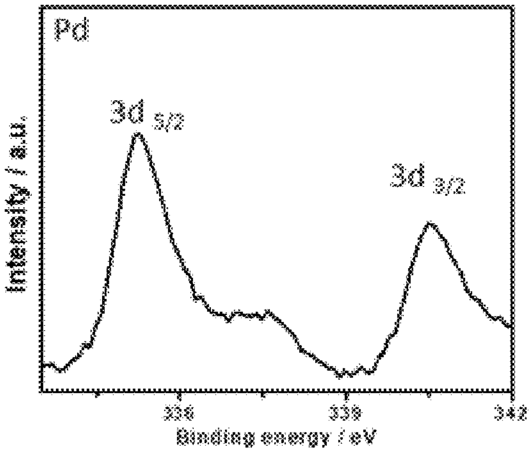
FIG. 10B is a high-resolution XPS spectra of Pd 3d in the PtPdCu-2 PNDs.
Figure 10C:
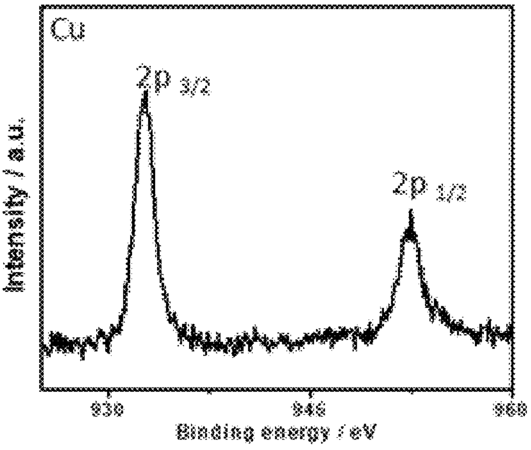
FIG. 10C is a high-resolution XPS spectra of Cu 2p in the PtPdCu-2 PNDs.

FIGS. 10A-10C show high-resolution XPS spectra of PtPdCu-2 PNDs, confirming the presence of Pt 4f (Pt $4f_{7/2}$ at 71 eV and Pt $4f_{5/2}$ at 74.3 eV), Pd 3d (Pd $3d_{5/2}$ at 335.3 eV and Pd $3d_{3/2}$ at 340.7 eV), and Cu 2p (Cu $2p_{3/2}$ at 933.5 eV and Cu $2p_{1/2}$ at 953.6 eV). The atomic contents of Pt, Pd, and Cu were about 4, 3.5, and 2.5, respectively.

Figures 11A, 11B, 12A, 12B, 13A, 13B:
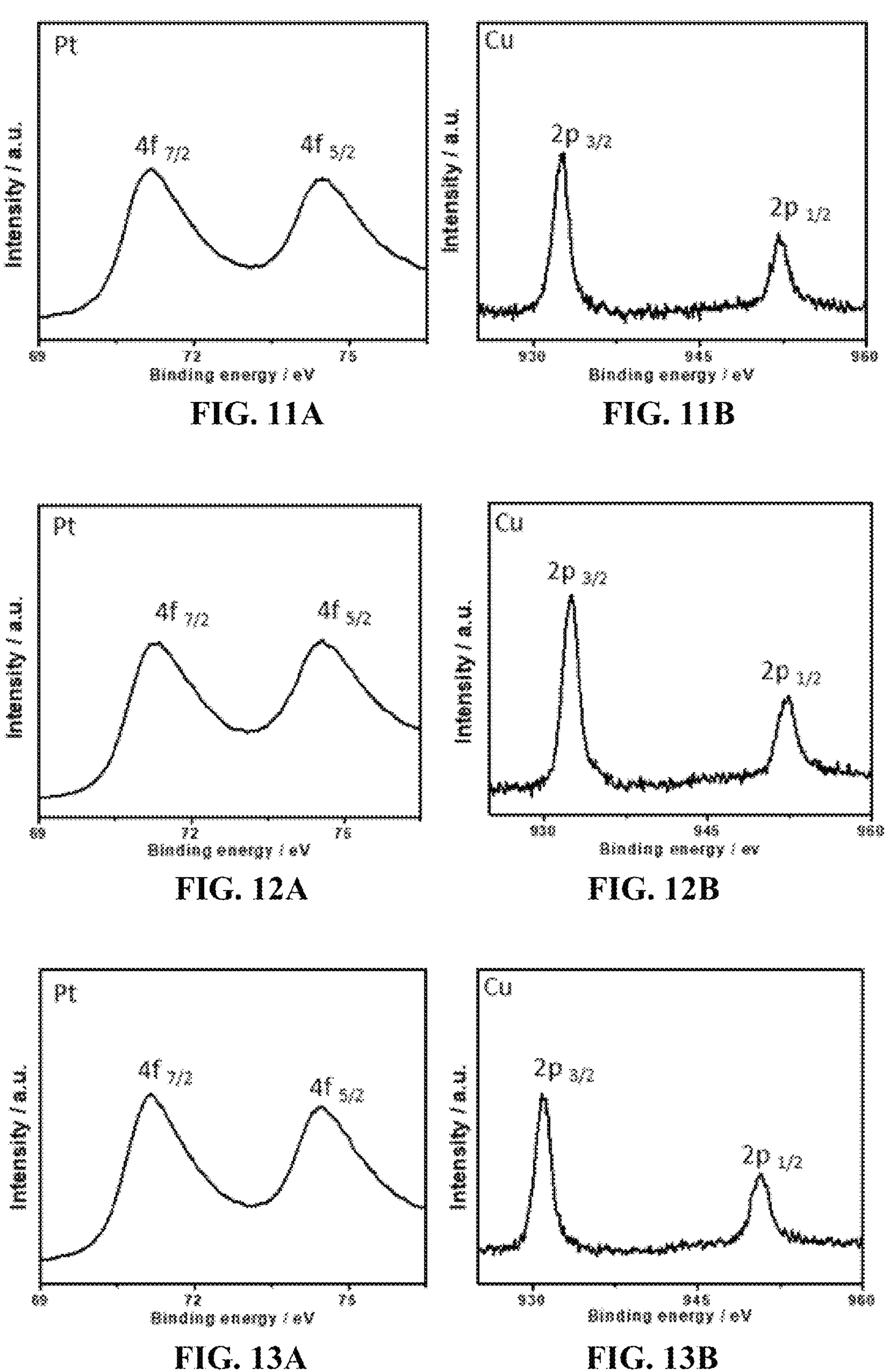
FIG. 11A is a high-resolution XPS spectra of Pt 4f in the PtCu-1 PNDs.
FIG. 11B is a high-resolution XPS spectra of Cu 2p in the PtCu-1 PNDs.
FIG. 12A is a high-resolution XPS spectra of Pt 4f in the PtCu-2 PNDs.
FIG. 12B is a high-resolution XPS spectra of Cu 2p in the PtCu-2 PNDs.
FIG. 13A is a high-resolution XPS spectra of Pt 4f in the PtCu-3 PNDs.
FIG. 13B is a high-resolution XPS spectra of Cu 2p in the PtCu-3 PNDs.

FIGS. 11A-11B show high-resolution XPS spectra of PtCu-1 PNDs, confirming the presence of Pt 4f (Pt $4f_{7/2}$ at 71.5 eV and Pt $4f_{5/2}$ at 74.6 eV) and Cu 2p (Cu $2p_{3/2}$ at 933.1 eV and Cu $2p_{1/2}$ at 953.2 eV). The atomic contents of Pt and Cu were about 7.5 and 2.5, respectively.

FIGS. 12A-12B show high-resolution XPS spectra of PtCu-2 PNDs, confirming the presence of Pt 4f (Pt $4f_{7/2}$ at 71.7 eV and Pt $4f_{5/2}$ at 74.7 eV) and Cu 2p (Cu $2p_{3/2}$ at 933.1 eV and Cu $2p_{1/2}$ at 953.2 eV). The atomic contents of Pt and Cu were about 8.5 and 1.5, respectively.

FIGS. 12A-12B show high-resolution XPS spectra of PtCu-3PNDs, confirming the presence of Pt 4f (Pt $4f_{7/2}$ at 70.9 eV and Pt $4f_{5/2}$ at 74.1 eV) and Cu 2p (Cu $2p_{3/2}$ at 933.5 eV and Cu $2p_{1/2}$ at 953.4 eV). The atomic contents of Pt and Cu were about 7 and 3, respectively.

The embodiments and examples described above are intended to be merely illustrative and non-limiting. Those skilled in the art will recognize or will be able to ascertain using no more than routine experimentation, numerous equivalents of specific compounds, materials and procedures. All such equivalents are considered to be within the scope and are encompassed by the appended claims.

What is claimed is:

1. A method for the synthesis of porous multimetallic nanocrystals comprising at least one 3d transition metal wherein the method comprises the following steps:

a) mixing the at least one 3d transition metal precursor and the at least one metal catalyst precursor in an aqueous solution of a non-ionic copolymer or surfactant and optionally adding a reducing agent to form a mixture;

b) continuously irradiating the mixture with acoustic waves at room temperature for no more than about 30 seconds to afford the porous multimetallic nanocrystals; and c) isolating and purifying the porous multimetallic nanocrystals.

2. The method of claim 1, wherein the at least one 3d transition metal precursor is a Cu precursor and the at least one metal catalyst precursor is a Pt and Pd precursor.

3. The method of claim 2, wherein the Cu precursor is $CuCl_2 \cdot 2H_2O$, the Pt precursor is $K_2PtCl_4$, and the Pd precursor is $K_2PdCl_4$.

4. The method of claim 3, wherein the atomic ratio of Pt/Pd/Cu in the nanocrystals is about 4/2/1.5 as measured by ICP analysis.

5. The method of claim 1, wherein the at least one 3d transition metal precursor is a Cu precursor and the at least one metal catalyst precursor is a Pt precursor.

6. The method of claim 5, wherein the Cu precursor is $CuCl_2 \cdot 2H_2O$ and the Pt precursor is $K_2PdCl_4$.

7. The method of claim 6, wherein the atomic ratio of Pt/Cu in the porous multimetallic nanocrystals is about 2/0.5 as measured by ICP analysis.

8. The method of claim 1, wherein the porous multimetallic nanocrystals comprise one 3d transition metal.

9. The method of claim 8, wherein the 3d transition metal is copper (Cu).

10. The method of claim 1, wherein step (a) comprises adding a reducing agent to the mixture.

11. The method of claim 10, wherein the reducing agent is L-ascorbic acid.

12. The method of claim 1, wherein the diameter of the porous multimetallic nanocrystals is about 10 nm to 30 nm.

13. The method of claim 12, wherein the diameter of the porous multimetallic nanocrystals is about 18 nm to 22 nm.

14. The method of claim 1, wherein a reducing agent is not added to the mixture in step (a).

15. The method of claim 1, wherein the non-ionic copolymer is a poloxamer.

16. The method of claim 1, wherein the acoustic waves are generated by dipping a acoustic nebulizer operating at a frequency of about 10 mHz and an applied voltage of 9 V rms into the mixture.

17. The method of claim 1, wherein step (b) is for no more than 20 seconds.

18. The method of claim 1, wherein step (b) is for no more than 10 seconds.

19. The method of claim 1, wherein step (b) is for no more than 5 seconds.

20. The method of claim 1, wherein the diameter of the pores of the porous multimetallic nanocrystals is about 1 nm to 7 nm.

* * * * *